3,697,275
PROCESS FOR POLYMERIZING VINYL
COMPOUNDS
Yoshihide Hayakawa and Masato Satomura, Saitama, Japan, assignors to Fuji Photo Film Co., Ltd., Kanagawa, Japan
Continuation of abandoned application Ser. No. 643,978, June 6, 1967. This application Apr. 26, 1971, Ser. No. 137,718
Claims priority, application Japan, June 6, 1966, 41/36,388
Int. Cl. G03c 1/68, 5/00
U.S. Cl. 96—48 R
5 Claims

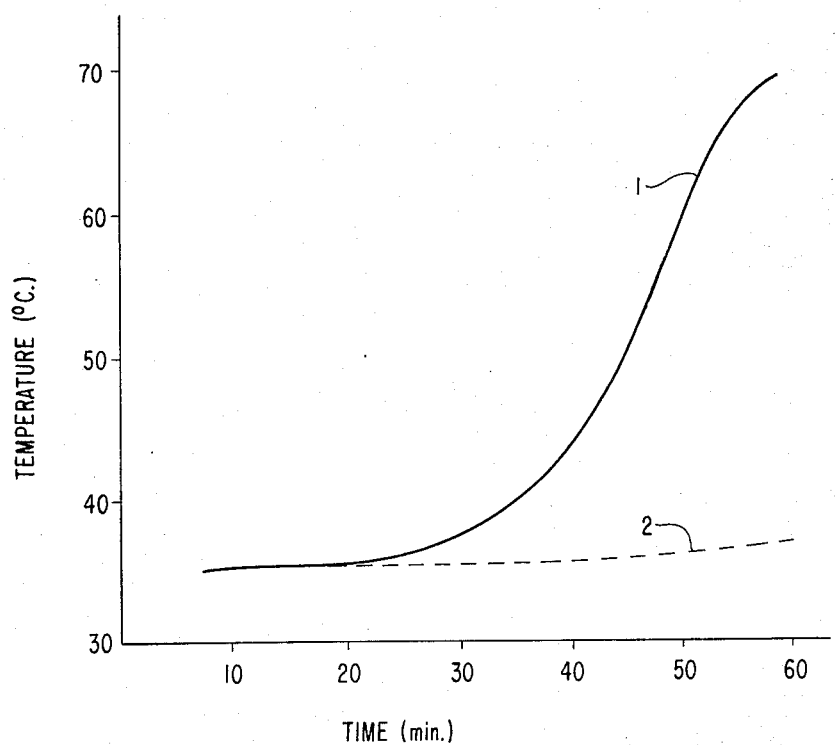

ABSTRACT OF THE DISCLOSURE

A process for polymerizing vinyl monomers. The initiation of the polymerization is caused by intermediate compounds formed during the development of photographic silver halide emulsions by certain phenolic reducing agents in the presence of vinyl monomers. The suitable phenolic compounds are resorcinol, m-aminophenol and their derivatives. Thus, a photographic image consisting of polymeric material can be formed corresponding to the photographic latent image produced in the emulsion. The polymerization is promoted by the presence of sulfite iron.

---

This is a continuation of application Ser. No. 643,978, filed June 6, 1967, now abandoned.

BACKGROUND OF THE INVENTION

(1) Field of the invention

This invention relates to the polymerization of vinyl compounds. The invention relates more particularly to a process for forming an image of a highly polymerized compound utilizing a silver halide photographic emulsion layer which has been subjected to imaging irradiation by electromagnetic waves or particle rays.

(2) Description of the prior art

There have been proposed various methods of forming images by the formation of highly polymerized compounds by photopolymerization of vinyl compounds. It has been proposed directly to effect photopolymerization using silver halides as the catalyst (British Pat. No. 866,631; S. Levinos et al., Photographic Science and Engineering, vol. VI, pp. 222–226, 1962). It is believed, in this reaction, that the photo-induced composition product of silver halide serves as the polymerization catalyst, and the sensitivity to light of this reaction does not reach the level which is easily attained by an ordinary developing out process. It also has been proposed to form images of highly polymerized compounds by polymerizing vinyl compounds using as a catalyst a silver image or unreacted silver halide, after development of an exposed silver halide emulsion with an ordinary developing solution (Belgian Pat. No. 642,477). This procedure has the defect that the development and polymerization should be conducted separately. It is theoretically of great interest to effect polymerization of vinyl compounds by the oxidation product or intermediate thereof formed in the course of development of a photographic silver halide emulsion by a reducing agent in the presence of the vinyl compounds, since it can be expected that, in this procedure the polymerization is effected by both the amplifying effect of development and that of chain polymerization. It has already been proposed to effect such a reaction using as a reducing agent a benzenoid compound having at least two hydroxyl, amino or alkyl- or aryl-substituted amino groups in the ortho- or para-positions with each other on a benzene ring. (U.S. Pat. No. 3,019,104; G. Oster, Nature, vol. 180, p. 1275, 1957).

An object of the present invention is to convert a latent image on a photographic silver halide emulsion layer, formed by electromagnetic waves or particle rays, into an image of a highly polymerized substance by a simple procedure. Another object of this invention is to obtain a polymer image of desired properties by employing this procedure in recording or printing.

SUMMARY OF THE INVENTION

We have discovered that the polymerization of a vinyl compound is effected by reducing a silver halide, in the presence of the vinyl compound. with resorcinol, m-amino phenol or derivatives of them as disclosed hereinafter. In cases where the silver halide is in the form of a silver halide photographic emulsion, the reaction proceeds at a higher rate when the silver halide grains contain centers of development than when the grains have no developing centers. In this way polymerization can be performed, with proper selection of reaction conditions and durations, selectively in the areas of the emulsion where silver halide particles exist which centers of development, that is, in the case where the photographic emulsion layer has a latent image. The present invention is attained by employing this fact. It has also been found that the vinyl compound polymerization is accelerated by the presence of sulfite ions in the system.

BRIEF DESCRIPTION OF THE INVENTION

The drawing is a graph plotting increase in temperature in degrees centigrade vs. time in minutes, illustrative of vinyl polymerization, indicated by temperature rise, curve 1, and absence of polymerization, indicated by no temperature rise, curve 2.

DETAILED DESCRIPTION OF THE INVENTION

Thus, the present invention consists in subjecting a silver halide photographic emulsion layer which has received imaging exposure to electromagnetic waves or to particle rays and in which development centers exist in many silver halide grains, in either the areas that have received or that have not received said exposure, as a result of said exposure, to the action of at least one compound represented by resorcinol, m-aminophenol and their derivatives having neither OH nor $NH_2$ at the ortho- or para-position thereof, in the presence of a polymerizable vinyl compound or compounds, and polymerizing said vinyl compound or compounds in the area in which development centers exist in many silver halide grains.

In the practice of the present invention there may be used ordinary silver halide emulsion that form centers of development in the areas irradiated by electromagnetic waves or particle rays and yield negative images, and there may also be used so-called direct positive emulsions that form centers of development in silver halide particles in the areas subjected to the imaging exposure.

In the present invention, as a silver halide photographic emulsion that gives a negative image, an emulsion which is suitable for ordinary developing out processes can conveniently be used. Thus, silver chloride, silver bromide, silver chlorobromide, silver iodobromide and silver chloroiodobromide photographic emulsions can be used. Chemical sensitization and/or optical sensitization which are applicable to ordinary photographic emulsions can be applied to the silver halide emulsions for the present invention. Thus sulfur sensitization and noble metal sensitization are applicable for the chemical sensitization (see for example, P. Glafkides, Chimie Photographique, 2nd edition, Photocinema Paul Montel, Paris, 1957, pp. 247–301). As for optical sensitization, optical sensitizers for ordinary photographic emulsions, such as cyanine dyes and merocyanine dyes, can be used conveniently (see for example, Kikuchi et al., Kagaku Shashin Benran (Handbook of Scientific Photography), vol. II, pp. 15–24, Maruzen Co., Tokyo, 1959). The emulsion to be used in the present invention may also contain stabilizers as employed in the conventional photographic techniques.

The direct positive silver halide emulsion which can be employed in the present invention may be prepared by applying solarization, Herschel effect, Clayden effect or Sabatier effect. On these effects full explanations are given in chapters 6 and 7, by C. E. K. Mees, of "The Theory of the Photographic Process," the second edition, published by McMillan Co., 1954. To prepare direct positive silver halide photographic emulsions applying solarization, silver halide emulsion susceptible to solarization is prepared and then, subjected to uniform exposure to light or to the action of a chemical to render it developable without imagewise exposure. The methods of preparation of such emulsions are disclosed in British Pats. Nos. 443,245 and 462,730.

The Hershel effect is produced by exposing to a light of longer wavelength a photographic emulsion which has been rendered developable by a uniform exposure to light of shorter wavelength or a uniform action of a chemical reagent. In this case it is preferable to use a silver halide emulsion containing silver chloride for the most part and a desensitizer, such as, phenosafranine or pynakryptol yellow, may be added to the emulsion to enhance the effect. The method of preparation of direct positive emulsions applying the Herschel effect is disclosed in British Pat. No. 667,206 and U.S. Pat. No. 2,857,273.

In order to obtain a positive image directly by using the Clayden effect, it is necessary to subject an emulsion to overall exposure to light of a relatively low intensity, after imaging exposure to light of a high intensity for a short period of time. In this way, the areas of the emulsion which have not been exposed to irradiation by the high intensity light become developable, after the overall exposure.

The Sabatier effect is produced by exposing, to a uniform action of light or a chemical reagent, in a state of immersion in a developing solution, a silver halide photographic emulsion layer that has received imaging exposure to light. This gives rise to development capability in the area that has not been exposed to the imaging exposure. The Clayden effect and Sabatier effect are easily and practically obtained in silver halide emulsions that have a tendency to yield centers of development, by the first exposure, in the inner portion rather than in the surface portion of grains of silver halide. The method of preparing such emulsions that have a tendency to yield internal centers of development is disclosed in U.S. Pats. Nos. 2,592,250 and 2,497,876, British Pat. No. 1,011,062 and German Pat. No. 1,207,791.

The photographic emulsions mentioned above consist of dispersion systems in which particles of silver halide are dispersed in a solution of a high polymer. As the high polymer for this purpose gelatin is widely employed. Polyvinyl alcohol, polyvinyl pyrrolidone, polyacrylamide and like synthetic high polymers and carboxymethyl cellulose, oxyethyl cellulose, dextran and like derivatives of naturally occurring high polymers may also be employed, either alone or in mixtures with gelatin (refer to F. Evva: Zeitschrift fur Wissenschaftliche Photographie, Photophysik und Photochemie, vol. 52, pp. 1–24, 1957).

The compound (I) to be employed in the present invention includes, for example, phenolic compounds as follows:

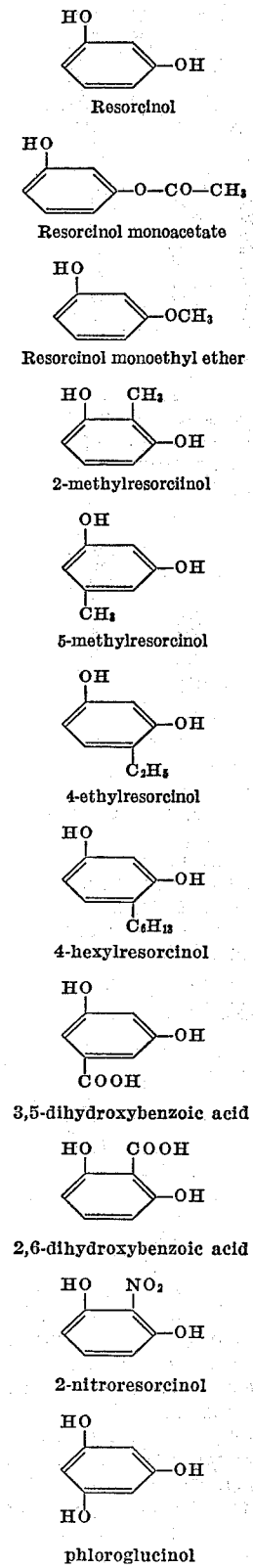

Resorcinol

Resorcinol monoacetate

Resorcinol monoethyl ether 2-methylresorcinol 5-methylresorcinol 4-ethylresorcinol 4-hexylresorcinol 3,5-dihydroxybenzoic acid 2,6-dihydroxybenzoic acid 2-nitroresorcinol phloroglucinol

5

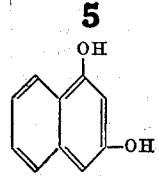
1,3-naphthalene diol

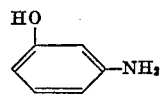
m-aminophenol

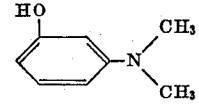
m-(N,N-dimethylamino)phenol

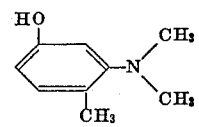
5-hydroxy-N,N-dimethyltoluidine

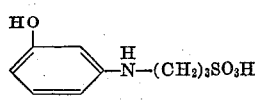
3-(m-hydroxyanilino)-1-propane-sulfonic acid

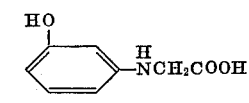
m-hydroxyphenylglycine

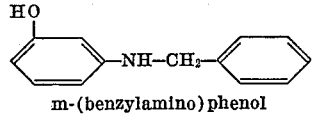
m-(benzylamino)phenol

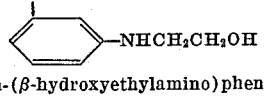
m-(β-hydroxyethylamino)phenol

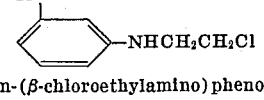
m-(β-chloroethylamino)phenol

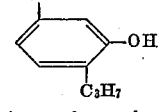
4-propylresorcinol

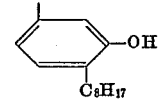
4-octylresorcinol

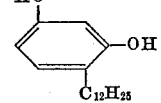
4-dodecylresorcinol

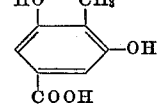
3,5-dihydroxy-4-methylbenzoic acid

6

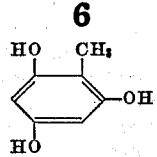
2-methylphloroglucinol

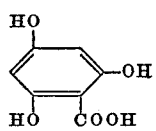
2,4,6-trihydroxybenzoic acid

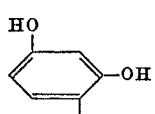
4-butylresorcinol

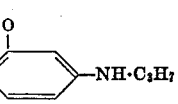
m-(Propylamino)phenol

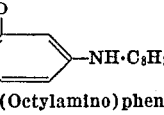
m-(Octylamino)phenol

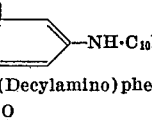
m-(Decylamino)phenol

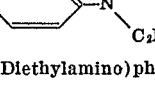
m-(Diethylamino)phenol

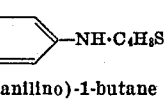
4-(m-hydroxyanilino)-1-butane sulfonic acid

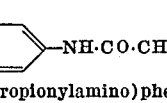
m-(propionylamino)phenol

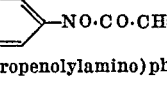
m-(propenolylamino)phenol

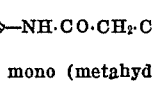
succinic acid mono (metahydroxyanilide)

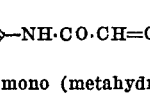
maleic acid mono (metahydroxyanilide)

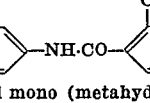
phtharic acid mono (metahydroxyanilide)

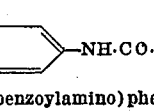
m-(benzoylamino)phenol

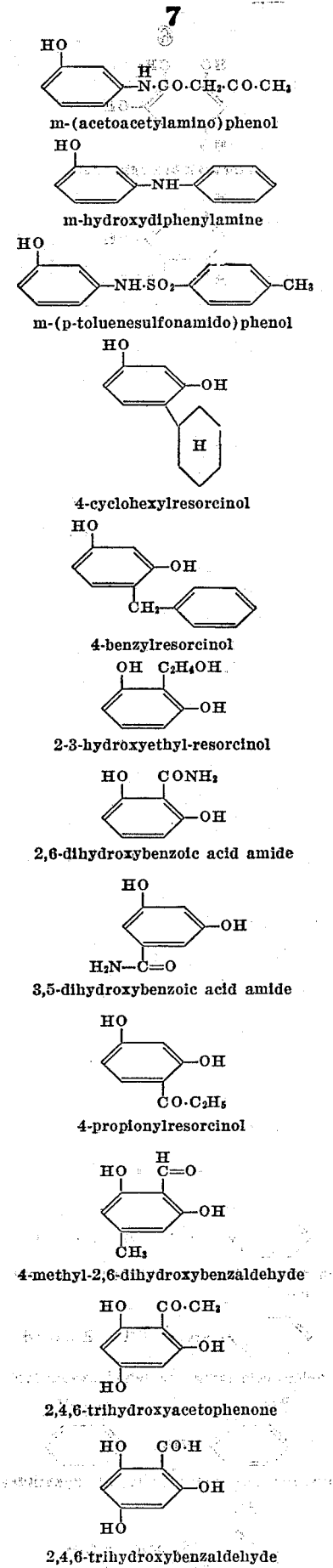

The process for synthesis of such phenolic compounds is well known in the art, and the compounds are commercially available.

The vinyl compounds to be employed in the present invention include normally liquid and solid compounds capable of addition polymerization and mixtures thereof. Examples are acrylamide, acrylonitrile, N-hydroxymethylacrylamide, methacrylamide, acrylic acid, calcium acrylate, sodium acrylate, methacrylamide, methyl methacrylate, methyl acrylate, ethyl acrylate, vinyl-pyrrolidone, vinyl methyl ether, vinyl butyl ether, vinyl isopropyl ether, vinyl butyrate, 2-vinylpyridine, 4-vinyl-pyridine, 2-methyl-N-vinylimidazole, potassium vinyl-bensensulfonates, vinylcarbazole and the like. For the present invention compounds having two or more vinyl groups are particularly suitable, and the compounds may be used alone or in mixture with a monovinyl compound as listed above. Examples of such compounds having two or more vinyl groups are N,N'-methylenebis (acrylamide), ethylene glycol dimethacrylate, diethylene glycol dimethacrylate, triethylene glycol dimethacrylate, polyethylene glycol dimethacrylates, divinyl ether, divinylbenzene and the like.

Although it is convenient for the present invention to employ water soluble vinyl compounds, water insoluble vinyl compounds may be employed in the form of emulsions. The emulsification may be carried out in a conventional manner using a suitable agitating device in the presence of a surface active agent and/or a high polymer.

In the present invention there may be used any of the electromagnetic waves and particle rays to which the ordinary photographic emulsions are sensitive. Thus, visible rays, ultraviolet rays, infrared rays of wavelengths not exceeding 1.3 microns, X-rays and γ-rays and electron beams, α-rays and like particle rays can be used.

In carrying out the present invention it is necessary to conduct the step of irradiation by electromagnetic waves or particle rays and the step of reduction and polymerization. In particular in the recording of images, it is necessary that the silver halide grains change their locations little during the period between the irradiation by electromagnetic waves or particle rays and the polymerization in the reaction system and, accordingly, it is preferable that the system be maintained in a highly viscous liquid state or in a gel state. While photographic emulsions have some viscosity and are susceptible to gelling, since they contain natural or synthetic high polymers, some high polymers may be added to the emulsion before use, if necessary.

On irradiation by electromagnetic rays or particle rays the silver halide grains may be dispersed in an aqueous solution or held in a dry gel. Thus, a highly viscous or gelled photographic emulsion on a suitable support or substrate may be subjected to the irradiation, either in an undried state or a dried state. As the reduction and polymerization take place concurrently, the reduction should be conducted in the presence of a vinyl compound or compounds. While in the present invention both the vinyl compound and the phenolic compound may be incorporated in the photographic emulsion before exposure, only one of them may be incorporated in the emulsion before exposure, the other being added to the system after the exposure and it is also possible to add both compounds after exposure.

As the reduction and polymerization must be conducted in the presence of water, it is necessary to conduct the reduction and polymerization in an aqueous solution or in a wet gel.

In general the reaction is conducted in the presence of a suitable quantity of an alkali, as it proceeds smoothly under alkaline conditions. While the amount of alkali suitable for the reaction depends on the kind of silver halide, of reducing agent and of high polymer in the system and their concentrations and the reaction temperature, it is preferable to use an amount sufficient to make the pH of the system 7.5 or more. In the cases where the photographic emulsion is used in the form of a coated film on a support, the reaction can be performed by immersing the thus produced photosensitive material in an alkaline aqueous solution, after it has been exposed to the electromagnetic waves or particle rays. In this case the vinyl compounds and/or the reducing agents can be conveniently dissolved in the aqueous alkaline solution.

Although stopping of the reaction is readily achieved by adjusting the pH of the system to, e.g., 5 or less, it may also be attained by cooling, removing the reactants by washing, dissolving the silver halide by fixation or adding a polymerization inhibitor to the system.

In the case where the high polymer as the vehicle for the silver halide grains and the monomeric vinyl compound are mixed and coated together to form a film, it is preferable to add a small amount of an inhibitor for thermal polymerization in order to prevent the spontaneous thermal polymerization of the vinyl monomer. For such a polymerization inhibitor any of the known thermal radical polymerization inhibitors, such as p-methoxyphenol, hydroquinones, 2,6 - di - tert.butyl - p - cresol, β-naphthol and the like, can be utilized.

When the vinyl monomer is contained in the system from the first, it is incorporated in an amount by weight of from $\frac{1}{30}$ to 30, and preferably from $\frac{1}{4}$ to 4 times the amount of the high polymer which is originally present in the system. The silver halide is conveniently used in an amount by weight of from $\frac{1}{20}$ to 2, and preferably $\frac{1}{10}$ to $\frac{1}{2}$ times the amount of the high polymer which is originally present in the system. When the reducing agent is to be added to the system before the reaction, it is suitable to add it in the amount of from $\frac{1}{10}$ to 20 moles per mole of the silver halide. It is convenient to add the thermal polymerization inhibitor in an amount of from 10 to 20,000 p.p.m. of the weight of the vinyl compound. In the case where the vinyl monomers are dissolved in the processing solution, it is usually preferable to dissolve them in as high a concentration as possible, hence the preferable concentration of the monomer is determined mainly by the solubilty of the monomer in the solution. In a case where the phenolic reducing agents are dissolved in the processing solution, it is suitable to dissolve them in a concentration between $\frac{1}{20}$ and 5 mols per liter, and preferably between $\frac{1}{10}$ and 1 mol per liter.

It is similar to the ordinary silver halide photographic process that there can be any interval of time between the exposure to electromagnetic waves or particle rays and the processing of polymerization. In some cases, according to the characteristics of the photographic emulsion or the condition and the length of the interval, the effect of the exposure may be diminished to some extent and in this case the decrease in effect can be cancelled by increasing the amount of the exposure.

In case of applying the process of the present invention in recording images, it is possible to make use of differences in solubility, light scattering, tackiness, dye-receptivity and other physical and chemical properties between monomeric vinyl compounds and polymers thereof. Relief image of polymeric material may be formed by dissolving away unpolymerized portions, after the irradiation and polymerization, making use of the difference in solubility between the polymerized portions and the unpolymerized portions so as to leave the thus formed highly polymerized compound as an image only in the irradiated areas.

In this case, it is convenient that the high polymer originally present in the system can be washed away with unpolymerized vinyl compound. Accordingly, it is preferable that the high polymer originally present in the system be a linear, substantially uncrosslinked one, or such a crosslinked one that is susceptible to chain fission or break-up of crosslinkage, and that the highly polymerized compound formed by the polymerization of the vinyl compound is a crosslinked one of so-called three-dimensional structure. For this reason it is convenient to employ a compound having a plurality of vinyl groups, as set forth above, either alone or in combination with a compound having only one vinyl group. It is, however, not essential to employ the compound having a plurality of vinyl groups, since there are many instances where a great extent of difference exists between the portions containing the high molecular substance formed by polymerization of the vinyl compound and the portions not containing such high polymeric substance. This is true even if the resulting highly polymerized substance is a linear soluble one, due to interaction of the highly polymerized substance formed by polymerization and the high polymer originally present in the system, as in the case of polyacrylic acid and gelatin.

The image which is made by this procedure and consists of highly polymerized substances can be applied in various printing processes.

While the mechanism of initialing the polymerization of the vinyl compounds with reduction of silver halide with said phenols is not yet clear, it is believed that the polymerization proceeds as a radical polymerization mechanism, since the process is applicable to any vinyl compounds capable of radical polymerization and the reaction is retarded by radical polymerization inhibitors. It is not yet clear whether the radical is formed directly by the reaction between phenols and silver halide or is formed by a further reaction with other components in the system, such as water, oxygen, etc.

The tanning development process, in which gelatin molecules are crosslinked with the oxidation products of the developing agent, has been well known in the art as a process for making an image consisting of high polymer. However, in this process the available image is restricted to that which consists of crosslinked gelatin. In contrast, according to the present invention, it is possible to obtain a variety of images differing in dye-receptivity, chemical resistance and other properties depending on the nature of the vinyl compound being employed. This is a characteristic of the present invention.

Furthermore, we have found that the polymerization of the vinyl compound in the process of the present invention is accelerated by the presence of sulfite ions in the system.

Sulfite ion may be added to the reaction system either in the form of a compound, which has originally contained the sulfite ion in the molecule, such as, alkali metal sulfites or ammonium sulfite, or in the form of a compound which will give a sulfite ion as the result of hydrolysis, such as, pyrosulfites of alkali-metals and ammonium or the adducts of bisulfites with aldehydes, such as, formaldehyde or glyoxal. Although the appropriate amount of sulfite ion to be added depends upon the nature and amount of the reducing agent and the vinyl monomer being used, the pH of the system and other factors, more than 0.05, especially more than 0.2 mole per liter of the system is effective.

It is commonly known in the art to add a sulfite in photographic developing solutions, and in such cases it is believed that the sulfite prevents auto-oxidation of a developing agent and uneven development, by reacting with the oxidation products of the developing agents, such as hydroquinone or p-aminophenol (see, for example, C. E. K. Mees, "Theory of the Photographic Process," the second edition, p. 652, published by McMillan Co. in 1954).

It should be noted that since the intermediate product of oxidation of phenols by silver halide initiates polymerization of vinyl compound or compounds in the process of the present invention the polymerization promoting effect of sulfite ion is essentially different from the action of removing oxidation products, as in the ordinary developing solutions mentioned above. The polymerization would be inhibited rather than promoted, if the sulfite simply removes the oxidation products as in conventional developing processes.

While the mechanism of action of sulfite ion in the process of the present invention is not obvious, it may be that the sulfite ion prevents the polymerization inhibiting action of free oxygen.

EXAMPLE 1

A fine grain gelatino silver chlorobromide photographic emulsion which contains silver chlorobromide, corresponding to about 42 g. of elementary silver and containing chlorine and bromine in molar ratio of 7:3, and about 60 g. of gelatin per liter was divided into two portions. Then, one of them was exposed to fluorescent lamps. For the purpose of exposure 200 cc. of the liquid emulsion at 35° C., was spread in a vat of 20 cm. x 25 cm. and then exposed to the light of about 300 lux for 5 minutes with continuous agitation. Each 10 cc. of the exposed and unexposed emulsions was poured into a separate test tube of a diameter of 1.6 cm., then 4.0 g. of acrylamide was dissolved in each of them and then 1.0 cc. of 1 molar aqueous solution of resorcinol was added to each of them. After agitating the mixture, the temperature of the sample was adjusted to 35° C and the test tube containing the sample was set in a heat insulating material. As the heat insulating material, polystyrene foam of about 2 cm. thickness was used and the samples together with the heat insulating material were immersed in a water bath, the temperature of which was maintained at 35° C. To each of the samples 0.4 cc. of 1 N aqueous sodium hydroxide solution was added immediately and then the changes in the temperature of the samples were recorded with a thermistor temperature recorder. Then the pH of the system was 9.3. The results were illustrated in the figure of the drawing in which line 1 indicates the temperature change of the emulsion exposed to light and the broken line 2 indicates that of the unexposed emulsion, respectively. In the exposed emulsion the temperature of the system was raised due to the heat of polymerization of acrylamide and it reached 70° C., 60 minutes after the initiation of the reaction. At this point of time, the emulsion lost its fluidity completely and became a resilient gel owing to the polyacrylamide formed, while the unexposed emulsion remained substantially unpolymerized, exhibiting little temperature rise and readily flowing out of the test tube. Then, the exposed emulsion had become brown due to reduction of silver halide, whilst substantially no discoloration was observed in the unexposed emulsion. By increasing the amount of acrylamide used from 4 g. to 6 g., and then to 8 g., the rate of reaction and the heat of reaction increased. For instance, in case of the exposed emulsion the temperature reached 115° C. after 35 minutes, when the amount of acrylamide was 6 g., and 112° C. after 22 minutes when the amount was 8 g. Of course, the liquid lost fluidity in both cases. On the other hand, in case of the unexposed emulsion, curve 2 on the graph, the temperature rose to 37° C. after 35 minutes when 6 g. of acrylamide was used and merely to 36° C. when 8 g. was used. In the absence of acrylamide neither heat was generated nor the fluidity of the liquid was lost.

Thus, that polymerization has occurred is obvious from the generation of the heat of polymerization and the change in fluidity of the whole system. The heat might be generated by reduction of silver halide other than by a polymerization reaction, but it was too little to be detected as a temperature change in the apparatus employed herein. For instance, employing hydroquinone instead of resorcinol, silver halide was reduced to black silver, but no heat generation was observed. That the heat generation was due to a polymerization reaction would be proved by the fact that the heat generated varied depending on the amount of acrylamide added.

In cases of the unexposed emulsion, a prolonged reaction time leads to generation of heat and gelation of the emulsion, but the phenomenon is equal to the phenomenon seen in ordinary photographic emulsions, i.e., an excessively prolonged time of development leads to reduction of the unexposed areas, so called, "fog," and finally to its disappearance. Hence, the usefulness of the photographic material of the present invention would not be interfered with at all by this fact.

The procedure as in this example was repeated using a reducing agent, a benzenoid compound, such as, paraaminophenol, ortho-aminophenol, hydroquinone, pyrocatechol or monomethyl-p-aminophenol sulfate, but heat of polymerization was not observed in any case.

EXAMPLE 2

The procedure of Example 1 was repeated except that resorcinol was replaced by phenols as listed in column 1 of Table 1 in amounts as indicated in column 2 of the table. In the table, the added amounts of an aqueous 1 N sodium hydroxide were listed in column 3, the times at which the temperature of the system containing exposed emulsion reached maximum were in column 4, the corresponding maximum temperatures were in column 5 and the temperatures of the unexposed emulsion at the same reaction time were in column 6. The table indicates that in all cases polymerization proceeds in the exposed emulsions with higher rate than in the unexposed emulsions.

TABLE 1

| Column No. 1 Reducing agent | 2 Mg. | 3 Cc. | 4 Min. | 5 °C. | 6 °C. |
|---|---|---|---|---|---|
| Resorcinol monoacetate | 160 | 2.0 | 35 | 72.5 | 37 |
| 2-methylresorcinol | 124 | 0.5 | 35 | 70 | 36.5 |
| 5-methylresorcinol | 124 | 0.5 | 27.5 | 94 | 35 |
| 4-ethylresorcinol | 138 | 4.0 | 62 | 44.5 | 41 |
| 4-hexylresorcinol | 194 | 4.0 | 80 | 48 | 40 |
| 3,5-dihydroxybenzoic acid | 154 | 3.0 | 45 | 65 | 40 |
| 2,6-dihydroxybenzoic acid | 154 | 3.0 | 105 | 62.5 | 37 |
| 2-nitroresorcinol | 155 | 4.0 | 45 | 47 | 42 |
| Phloroglucinol | 162 | 0.5 | 87 | 89 | 48 |
| Naphthalene-1,3-diol | 160 | 0.5 | 16 | 64.5 | 53 |
| m-Aminophenol | 109 | 0.5 | 70 | 77.5 | 35 |
| N,N-dimethyl-m-aminophenol | 137 | 1.5 | 75 | 59.5 | 44 |
| 4-hydroxy-N,N-dimethyl-o-toluidine | 151 | 0.5 | 45 | 68.5 | 35.5 |
| 4-(m-hydroxyanilino)-1-butane sulfonic acid | 221 | 2.0 | 25 | 93 | 60 |
| m-Octylaminophenol | 221 | 0.3 | 115 | 95 | 80 |
| 4-dodecylaminophenol | 278 | 1.0 | 23 | 65 | 60 |
| 2-methylphloroglucinol | 126 | 0.03 | 242 | 100 | 80 |
| m-Acetoacetylaminophenol | 193 | 1.0 | 74 | 78 | 68 |
| m-Benzoylaminophenol | 213 | 3.0 | 117 | 74 | 71 |
| 4-cyclohexylresorcinol | 192 | 1.0 | >55 | 100 | 61 |
| 2-β-hydroxyethylresorcinol | 154 | 2.0 | >80 | 100 | 64 |
| 3,5-dihydroxybenzoic acid amide | 151 | 1.0 | 67 | 91 | 64 |
| 4-propionylresorcinol | 180 | 2.0 | >30 | 100 | 61 |
| 2,6-dihydroxybenzoic acid amide | 151 | 2.5 | 35 | 87.2 | 83.5 |
| m-Hydroxydiphenylamine | 186 | 0.1 | 116 | 80 | 70 |
| 4-methyl-2,6-dihydroxybenzaldehyde | 153 | 2.0 | 55 | 100 | 90 |
| 2,4,6-trihydroxyacetophenone | 168 | 0.5 | 225 | 100 | 54 |

EXAMPLE 3

The procedure as in Example 1 was repeated except that 4 g. of acrylamide in Example 1 was replaced by 4 g. of 1-vinyl-2-methyl-imidazole. When 0.7 cc. of 1 N aqueous sodium hydroxide was added, the same reaction occurred as in Example 1. The temperature of an exposed emulsion reached 56° C. 60 minutes after initiation of the reaction, while the temperature of an unexposed emulsion was 41° C. at the same time.

When vinylpyrrolidone was employed as a vinyl compound, although the heat generation was less, rise of the viscosity due to polymerization was observed.

EXAMPLE 4

Although Examples 1–3 were carried out using water soluble vinyl compounds hardly soluble methyl methacrylate could be polymerized in a state of emulsion.

A methyl methacrylate emulsion was prepared by mixing 10 cc. of methyl methacrylate and 10 cc. of a 4% aqueous solution of gelatin and, after addition thereto of 0.2 g. of sodium dodecyl-benzenesulfonate and emulsifying in a homogenizer, 7 cc. of the emulsion thus formed was mixed with 8 cc. of a photographic emulsion as employed in Example 1. Then there was added 1 cc. of 1 molar aqueous resorcinol and 1.0 cc. of 1 N aqueous sodium hydroxide. The generation of heat was measured in the manner of Example 1. The temperature of the exposed emulsion reached 42° C. 12 minutes after the start of the reaction, but the temperature of the unexposed emulsion was then only 36° C. The emulsion which had been exposed and reduced to effect polymerization was neutralized with acetic acid and, after decomposition of gelatin by the addition of a gelatin decomposing enzyme, it was acidified with hydrochloric acid to destroy the emulsion. Then a mass of polymer, which was insoluble in water but soluble in methylene chloride, separated out. The polymer contained about 0.4% of nitrogen, hence, it was believed that it consisted essentially of polymethyl methacrylate partially combined with gelatin.

EXAMPLE 5

A procedure similar to Example 4 was repeated except that ethylene-glycol dimethacrylate was employed in place of methyl methacrylate. In this case the heat generation was little and the temperature rose only 3° C. at 30 to 50 minutes after the start of the reaction. However, there was obtained a white powdery, high polymer, insoluble in water and in organic solvents, by destruction of the emulsion in the same manner as in Example 4 and subsequent removal of silver and silver halide with sodium thiosulfate and potassium ferricyanide.

EXAMPLE 6

Polymerization was conducted using an emulsion containing, as a protective colloid, polyvinyl alcohol and polyvinylpyrrolidone, instead of gelatin.

Using a fine grain silver chlorobromide emulsion which contained silver chlorobromide, corresponding to about 20 g. of elementary silver and containing chlorine and bromine in molar ratio of 7:3, about 30 g. of polyvinylpyrrolidone and about 100 g. of polyvinylalcohol per liter of the emulsion, the emulsion which had been exposed to light in the same way as Example 1 for ten minutes was compared with the emulsion without exposure. The polymerization was carried out by adding to each 10 cc. of the emulsion 4 g. of acrylamide, 4 cc. of ¼ molar aqueous solution of meta-aminophenol and 0.6 cc. of 1 N sodium hydroxide and then the temperature of the exposed emulsion reached 60° C. after 25 minutes, while the temperature of the unexposed emulsion reached only 40° C. after the same period of time.

EXAMPLE 7

A photographic film bearing a layer of a gelatino silver chloroiodobromide emulsion was, after exposure, treated with a solution containing both resorcinol and sodium acrylate to effect image forming polymerization. The film was one that had been prepared by applying a subbing coat to both sides of a polyethylene terephthalate film, applying an anti-halation layer to one of the surfaces of the so under-coated film and applying to the other surface a silver halide photographic emulsion, which was prepared by adding a suitable amount of merocyanine dyes with a sensitization maximum of about 550 mm. for the sake of optical sensitization, and 1.5 g. of muco-chloric acid as a hardening agent. Further suitable stabilizing and wetting agents were added to a gelatino silver chloroiodobromide emulsion containing, per mol of silver, about 0.7 mol of chlorine, about 0.3 mol of bromine, about 0.001 mol of iodine and about 100 g. of gelatin. A coated film containing 50 mg. of silver per 100 cm.² was formed. There was further applied on said emulsion layer a gelatin protective layer of about 0.8µ thickness. The material is suitable for making line and half-tone images for the graphic arts. The film was exposed to light of 100 lux for 10 seconds through a negative of a line image, and then immersed under a read safe-light, in a solution of the following formulation:

| | |
|---|---|
| Sodium acrylate _____ g__ | 9 |
| 2 N aqs. sodium hydroxide _____ cc__ | 4.0 |
| 2 mol. aqs. resorcinol _____ cc__ | 3.0 |
| Water _____ cc__ | 8.0 |

After 8 minutes of immersion, the exposed areas discolored, indicating that the silver halide grains in the exposed areas were reduced (so called development). The film was then soaked in a 1.5% aqueous acetic acid, washed with running water and treated with a 1% aqueous solution of a gelatin-decomposing enzyme (sold under the trade name of "Bioplaze $PN_4$"), whereupon in the non-exposed areas gelatin was decomposed and washed away while in the exposed areas the emulsion layer was not washed away and a positive relief image was left corresponding to the negative image used for exposure. It is believed that the difference in resistance for decomposition between the exposed areas and non-exposed areas is due to the polymer of sodium acrylate being formed, in respect that the difference in resistance for decomposition between the areas corresponding to the lines in the negative and the remainder of the areas was not created when the treating solution contained no sodium acrylate. Also, the image became more distinct with the increase in the amount of sodium acrylate in the solution. When the exposed film was treated with an ordinary fixing solution, after treatment with the sodium acrylate-resorcinol solution as mentioned above, and without treatment with the enzyme, there was obtained a faint brown-colored image.

EXAMPLE 8

Similar procedures, as in Example 7, were repeated using the following film A and B.

Film A is one that is usually employed in preparation of the so subbed base an anti-halation layer, applying to and is prepared by applying to both sides of a cellulose triacetate base a subbing layer, applying to one surface of the so subbed base at anti-halation layer, applying to the other surface of the base a moderate grain size gelatin-silver halide emulsion, containing about 0.015 mole of iodine and about 0.985 mole of bromine and about 255 g. of gelatin per mole of silver, to which about 0.5 g. per 100 g. of gelatin, of mucochloric acid, as hardening agent, and a suitable stabilizer and surface active agent was added, in an amount to provide a coating layer containing 60 mg. of silver per 100 square centimeters, and applying thereover a protective layer of gelatin of 1 micron thickness.

Film B is such that is usually employed in preparation of line images or continuous tone images with steep gradation in photoengraving process and prepared by, to the same base as the film A, applying a fine grain gelatin-silver halide emulsion containing about 0.012 mole of iodine and about 0.988 mole of bromine and 204 g. of gelatin per mole of silver and sensitized with a rhodanate complex of monovalent gold and combined with about 0.7 g. per 100 g. of gelatin, of mucochloric acid and a suitable surface active agent, in an amount to provide a coating layer containing 60 mg. of silver per 100 sq. cm., and applying thereover a protective layer of gelatin of about 0.8 micron thickness.

After exposure, films A and B were soaked in the developing solution as in Example 7 for 45 minutes and 40 minutes, respectively, to obtain images undecomposable with the gelatin decomposing enzyme as in Example 7.

EXAMPLE 9

A gelatin-silver halide emulsion which had been combined with monomers and resorcinol was applied to a base and treated with an aqueous alkali bath to effect polymerization.

To 50 cc. of an emulsion, as employed in Example 1, there was added a solution of 8 g. of acrylamide, 0.8 g.

of methylene-bisacrylamide, 14 cc. of a 1 M aqueous resorcinol and 1.0 cc. of a 1/60 M p-methoxyphenol in 20 cc. of water and then 50 cc. of a 10% (wt.) aqueous solution of gelatin and 0.3 cc. of a 10% (wt.) aqueous chromium alum. The chromium alum was added to prevent damage to the photosensitive layer during development.

The emulsion thus formed was coated in a darkroom on a subbed cellulose triacetate base to form a coating layer of about 8 microns in thickness. After drying, a specimen of the photographic film thus formed was irradiated from the back thereof by a light of an intensity of 1,000 lux through an optical wedge of a step difference 0.15 for 10 seconds. The specimen was then soaked in a 0.4 N aqueous sodium hydroxide for about 5 seconds, withdrawn from the solution and allowed to stand still in a darkroom at about 20° C. After 30 minutes, discoloration occurred in the area corresponding to the tenth step of the optical wedge and in the areas with more exposure. When the film was treated with a 1.5% (wt.) aqueous solution of acetic acid to stop the reaction and washed with water at about 50° C., the areas corresponding to the discoloration remained undissolved. After stopping of the reaction when the specimen was fixed in the usual manner, there was obtained a very faint image, the optical density of which was merely 0.05 at the area corresponding to the tenth step of the optical wedge, while the former specimen had a relief image of 0.9 micron thickness at the area with the same exposure and, when stood still under ordinary illumination, there was obtained an optical density of about 0.7 due to the photodecomposition of the emulsion.

EXAMPLE 10

The same procedures as in Example 9 was repeated using a photographic emulsion not containing gelatin.

To 50 cc. of a photographic emulsion containing polyvinyl alcohol and polyvinylpyrrolidone, as employed in Example 6, there was added a solution of 10 g. of acrylamide, 1 g. of methylene-bis-acrylamide, 44 cc. of an aqueous m-aminophenol of 1/4 mole concentration, 1 cc. of an aqueous p-methoxyphenol of 1/60 mole concentration and 1 cc. of a 1% (wt.) aqueous sodium dodecylbenzenesulfonate. A paper, usually being used in preparation of printing paper, which had been impregnated with a 1% (wt.) aqueous solution of borax and dried, was coated with the emulsion thus formed and dried in a darkroom. The dried specimen was brought into close contact with a negative of a line image and the assembly was exposed for 10 seconds to a 500 watt xenon arc-lamp located 50 centimeters from the assembly. When the irradiated specimen was soaked in a 1.5 N aqueous sodium hydroxide for 5 seconds and allowed to stand still at room temperature for 10 minutes the exposed areas became brown. Then, it was soaked in a 1.5% (wt.) aqueous acetic acid to stop the reaction and then washed with water to make the non-exposed areas wash away leaving a brown ploymer relief.

EXAMPLE 11

The film as in Example 7 was irradiated with X-rays and treated with the same solution as in Example 7, using a cobalt X-ray tube made by Philips Co., at 30 kv., 10 ma. The specimens of the film were partly covered with a razon blade of 0.2 mm. thickness and located 1 cm. from the window of the tube.

Three specimens were exposed for 1, 2 and 10 seconds respectively, and then treated with a solution as in Example 7 at 30° C. for 9 minutes. In each specimen, only the irradiated area was darkened and there remained a polymer relief after enzyme decomposition in a similar manner as in Example 7.

EXAMPLE 12

An autopositive film utilizing the Herschel effect was made by applying to a polyethylene terephthalate film which had been coated with subbing layers, a fine grain silver chloride emulsion which had been given fog centers by chemical means and added with pinakryptol yellow in a similar manner as disclosed in British patent specification 667,206. The film was superposed with a transparency bearing a line image and exposed for two minutes through a yellow filter to a 2 kv. xenon arc-lamp located 50 cm. from the film, and the exposed film was soaked in a solution of the following formulation:

| | | |
|---|---|---|
| Acrylamide | g | 90 |
| Methylene-bis-acrylamide | g | 8 |
| Resorcinol | g | 5 |
| Potassium pyrosulfite | g | 3 |
| 2 N sodium hydroxide | cc | 28.5 |
| NaCl | g | 1 |
| Water | cc | 100 |

Silver halide in the no-exposed areas corresponding to the translucent areas of the image bearing transparency was reduced to brown. After treatment at 30° C., for 15 minutes, the film was soaked in a 1% (wt.) aqueous acetic acid solution to stop the reaction, washed with running water and soaked in a 1% aqueous solution of a gelatin decomposing enzyme, "Bioplaze PN$_4$." After the treatment with the enzyme solution, the non-exposed areas in which polymerization occurred remained undissolved, but the exposed areas in which no reduction and, accordingly, no polymerization occurred were decomposed by the enzyme and washed away, leaving a relief image in the emulsion layer corresponding to the line image in the image-bearing transparency.

EXAMPLE 13

A gelatin-silver chloroiodobromide photographic emulsion which had been prepared in the similar manner as disclosed in U.S. patent specification 2,592,250 and was apt to form internal latent image (development centers at the inner portions of the grains), was subjected to the action of hydrazine sulfate under alkaline conditions to form centers of "fog." To the emulsion were added suitable film hardening agents and surface active agents, and the emulsion was then applied to a subbed cellulose triacetate base to obtain a film which would directly yield a positive image by solarization. For instance, a silver image of an optical density of 3 or more was obtained when the film was developed without exposure to light, using a developing solution having the following composition at 20° C., for 4 minutes and fixed and washed in the usual manner, while a silver image of an optical density of merely 0.008 was obtained when developed, fixed and washed with water in the similar manner after exposure for 2 minutes to a 500 w. incandescent lamp located 50 centimeters from the film:

| | G. |
|---|---|
| p-Monomethylaminophenol sulfate | 1 |
| Anhydrous sodium sulfite | 75 |
| Hydroquinone | 10 |
| Sodium carbonate monohydrate | 30 |
| Potassium bromide | 5 |
| Water to make 1 liter. | |

On the film was superposed a transparency bearing a positive image, and the assembly was exposed for 2 minutes to a 500 w. incandescent lamp located 50 centimeters from the film and the so exposed film was soaked in a solution of the following composition:

| | | |
|---|---|---|
| Sodium methacrylate | g | 50 |
| 5-methylresorcinol | g | 3.8 |
| 2 N sodium hydroxide (aqs.) | cc | 7.5 |
| Water to make 100 cc. | | |

Treated at 35° C., for 15 minutes, faint silver image and polymer were formed in the areas corresponding to the line image in the transparency. The reaction was stopped using a 1.5% (wt.) aqueous acetic acid, and the film was then washed with running water and treated with an enzyme to decompose gelatin. Then the exposed areas were readily decomposed and washed away, while the non-exposed areas remained undecomposed due to the polymerizate formed, leaving a positive relief image in the emulsion layer. When the film was dried directly after washing with running water, without decomposing by the enzyme, there was formed a relief image in which the areas corresponding to the line image in the original transparency were about 2 microns thicker than the non-image areas, indicating the formation of polymerizate.

EXAMPLE 14

The same film as in Example 12 was exposed in a similar manner, as in Example 12, and then soaked in a solution of the following formulation, at 30° C.

Sodium acrylate _____ g__ 50
Meta-aminophenol _____ g__ 3.5
2 N sodium hydroxide (aqs.) _____ cc__ 7.0
Water to make 100 cc.

After soaking for 15 minutes the film was subjected to stopping of polymerization and decomposition of gelatin in a similar manner, as in Example 12, and there was obtained a positive relief image of high polymer.

EXAMPLE 15

After exposure to light the same film as in Example 7 was treated with a solution containing resorcinol, sodium methacrylate and sodium sulfite to effect image forming polymerization. On the film, a negative of a line image was superposed and the film was exposed for 10 seconds to light of an intensity of about 100 lux. Then, under a safe-light, the film was immersed in solutions of the following formation:

Sodium methacrylate _____ 50 g.
Resorcinol _____ 3.3 g.
NaOH _____ Amount sufficient to
Water to make 100 cc.          adjust the pH of the
                               solution to 10.0.
Sodium sulfite _____ 0, 0.5, 2.0 or 8.0 g.

Four solutions containing 0, 0.5, 2.0 and 8.0 respectively, of sodium sulfite were employed.

After immersion at 30° C., for various periods of time, the film was soaked in a 1.5% (wt.) aqueous acetic acid to stop the reaction, washed with running water and soaked in a 1% (wt.) aqueous solution of a gelatin decomposing enzyme, "Bioplaze $PN_4$." Then, polymerized areas remained undissolved, but the unpolymerized or partially polymerized areas were dissolved away.

In the case of a solution containing no sodium sulfite, a weak film of polymerizate was formed in the exposed areas after soaking for 11 minutes. In the case of a solution containing 0.5 g. of sodium sulfite, polymerizate was formed in the exposed areas after 8 minutes and a strong film was formed after 11 minutes. In cases of solutions containing 2.0 and 8.0 g. of sodium sulfite, strong films of polymerizate were formed in the exposed areas after 8 minutes. When these samples were, after treatment with the solutions as set forth above, fixed with an ordinary fixing solution to remove the silver halide there were obtained brown-colored silver images, indicating that a small proportion of silver halide was reduced in the exposed areas. The optical density of the silver images was practically independent on the amounts of sodium sulfite; this would indicate that reduction of silver halide by resorcinol is not promoted, but the polymerization by the oxidation product of resorcinol formed in the course of reduction of silver halide is promoted by the presence of sodium sulfite.

EXAMPLE 16

A film as employed in Example 7 was exposed to light as in Example 7 and treated with solutions of the following formulations:

Sodium methacrylate _____ 50 g.
N,N-dimethyl-m-amino-
  phenol _____ 4.1 g.
Sulfites _____ As indicated in Table 1.
NaCl _____ 1.0 g.
NaOH _____ Amount sufficient to adjust
                             the pH to 10.5.
Water to make 100 cc.

TABLE 2

| Sulfites | Amount (g.) |
|---|---|
| Number: | |
| 1 _____ (Control) | -- |
| 2 _____ Sodium sulfite | 2.0 |
| 3 _____ do | 8.0 |
| 4 _____ Ammonium sulfite | 2.0 |
| 5 _____ do | 8.0 |
| 6 _____ Potassium pyrosulfite | 1.0 |
| 7 _____ do | 2.0 |
| 8 _____ Adduct of sodium bisulfite with formaldehyde (monohydrate). | 8.0 |

The film was treated with the solution at 30° C., for 15 minutes and then with an enzyme as in Example 1. Then, in case of solution 1, the emulsion layer was dissolved away without distinction between the exposed and non-exposed areas but, in cases of solutions 2 to 8, image forming films, consisting of the thus formed polymer and the emulsion, remained in the exposed areas. Especially in cases of solutions 3, 5, 7 and 8, strong films remained.

EXAMPLE 17

To 100 cc. of the same fine grain silver chlorobromide emulsions as in Example 1, there was added an aqueous solution containing 8 g. of acrylamide, 4 g. of potassium pyrosulfite and 0.8 g. of methylene-bis-acrylamide and then 1.0 cc. of a 1/50 mol aqueous solution of p-methoxyphenol and 0.3 cc. of a 10% aqueous solution of chromium alum. The so modified emulsion was then applied to a subbed cellulose triacetate base and dried to form a dry layer of about 10 microns in thickness, in a dark room. The film was irradiated from the back thereof by light of an intensity of 1,000 lux for 5 seconds through a transparency bearing a line image. The exposed film was then coated with an aqueous solution containing, per 100 cc., 6.6 g. of resorcinol and 4.2 g. of sodium hydroxide, and allowed to stand still at room temperature. The exposed areas discolored indicating formation of a faint silver image. After 1 hour, the film was washed with warm water. Then the non-exposed areas were washed away leaving a positive relief image of unsolubilized emulsion corresponding to the negative line image of the original. Although a similar result was obtained also in case of an emulsion not containing potassium pyrosulfite, the relief image was not so strong and clear as in the case of the potassium pyrosulfite-containing emulsion set forth above.

What is claimed is:
1. A process for the polymerization of a vinyl compound comprising
   providing a photographic emulsion layer containing silver halide particles, exposing said layer to provide a latent image and subsequently,
   in the presence of said vinyl compound and under alkaline conditions, reducing said silver halide with a compound selected from the group consisting of resorcinol, m-aminophenol, and their derivatives, said compound being free from hydroxyl and amino groups at the ortho and para positions.
2. The process as claimed in claim 1, wherein said polymerization is conducted in the presence of sulfite ion.
3. The presence as claimed in claim 1, wherein said derivative of resorcinol is selected from the group consist- ing of resorcinol monoacetate, 2-methylresorcinol, 5-methylresorcinol, 4-ethylresorcinol, resorcinol monomethylether, 4-hexylresorcinol, phloroglucinol, 3,5-dihydroxybenzoic acid, 2,6-dihydroxybenzoic acid, 2-nitroresorcinol, naphthalene-1,3-diol, 4-propylresorcinol, 4-octylresorcinol, 4-dodecylresorcinol, 3,5 - dihydroxy - 4-methylbenzoic acid, 2-methylphloroglucinol, 2,4,6-trihydroxybenzoic acid, 4-butylresorcinol, 4-cyclohexylresorcinol, 4-benzylresorcinol, 2-$\beta$-hydroxyethylresorcinol, 2,6-dihydroxybenzoic acid amide, 3,5-dihydroxybenzoic acid amide, 4-propionylresorcinol, 4-methyl-2,6 - dihydroxybenzaldehyde, 2,4,6-trihydroxyacetophenone, and 2,4,6-trihydroxybenzaldehyde.

4. The process as claimed in claim 1, wherein said derivative of m-aminophenol is selected from the group consisting of m-dimethylaminophenol, 5-hydroxy-N,N-dimethyl-o-toluidine, 3-(m-hydroxyanilino)-1-propane sulfonic acid, m-hydroxyphenylglucine, m-(benzylamino) phenol, m-($\beta$-hydroxyethylamino)phenol, m-($\beta$-chloroethylamino)phenol, m-(propylamino)phenol, m-(octylamino)phenol, m-(decylamino)phenol, m-(diethylamino) phenol, m - (propanoylamino)phenol, 4 - (m - hydroxyanilino)-1-butane sulfonic acid, m-(propylamino)phenol, succinic acid mono(meta hydroxyanilide), maleic acid mono(meta- hydroxyanilide), phthalic acid, mono(meta- hydroxyanilide), m-(benzoylamino)phenol, m - (acetoacetylamino)phenol, m-hydroxydiphenylamine, and m-(p-toluenesulfonamido)phenol.

5. The process as claimed in claim 2, wherein said sulfite ion is supplied by a member selected from the group consisting of sodium sulfite potassium sulfite, sodium pyrosulfite, potassium pyrosulfite, formaldehyde adduct of sodium bisulfite, and ammonium sulfite.

References Cited
UNITED STATES PATENTS

| | | | |
|---|---|---|---|
| 3,019,104 | 1/1962 | Oster | 96—29 |
| 3,038,800 | 6/1962 | Luckey et al. | 96—35 |
| 3,194,661 | 7/1965 | Cohen | 96—48 |
| 3,234,021 | 2/1966 | Schwerin et al. | 96—28 |
| 3,236,644 | 2/1966 | Gilman et al. | 96—85 |

FOREIGN PATENTS

| | | | |
|---|---|---|---|
| 866,631 | 4/1961 | Great Britain | 96—115 |

RONALD H. SMITH, Primary Examiner

U.S. Cl. X.R.

96—35.1, 115 P